US005816680A

United States Patent [19]

Sato

[11] Patent Number: 5,816,680

[45] Date of Patent: Oct. 6, 1998

[54] VEHICULAR LAMP HAVING IMPROVED OUTER APPEARANCE

[75] Inventor: Masakazu Sato, Shizuoka, Japan

[73] Assignee: Koito Manufacturing Co., Ltd., Tokyo, Japan

[21] Appl. No.: 688,789

[22] Filed: Jul. 31, 1996

[30] Foreign Application Priority Data

Aug. 22, 1995 [JP] Japan .................................... 7-236199

[51] Int. Cl.$^{6}$ ........................................................ B60Q 1/00

[52] U.S. Cl. .............................. 362/61; 362/80; 362/346; 362/307

[58] Field of Search ............................... 362/61, 80, 346, 362/307

[56] References Cited

U.S. PATENT DOCUMENTS

| | | | |
|---|---|---|---|
| 4,558,402 | 12/1985 | Tysoe | 362/293 |
| 5,062,030 | 10/1991 | Figueroa | 362/346 |
| 5,075,828 | 12/1991 | Gordin et al. | 362/297 |
| 5,406,464 | 4/1995 | Saito | 362/61 |
| 5,577,833 | 11/1996 | English et al. | 362/297 |

*Primary Examiner*—Ira S. Lazarus
*Assistant Examiner*—Nhat-Hang H. Lam
*Attorney, Agent, or Firm*—Sughrue, Mion, Zinn, Macpeak & Seas, PLLC

[57] ABSTRACT

A vehicular lamp having an improved external appearance, wherein a proximate part of a corner part of the reflective surface and a part (approximately the upper half) of the adjacent non-reflective surface are segmented in the diagonal direction in the prescribed width, and a plurality of small reflective surfaces are formed in a step-like manner in the diagonal direction in this segmental part. The front-view appearance of the lamp when the bulb is illuminated is improved thus through illumination of the reflector to the most exterior point at the corner part with the reflected light provided from the small reflective surfaces. The available solid angles on both sides of the segmental part are wider than in the case where the entire areas of the reflector are formed as a multiple reflection surface so as to eliminate every non-reflective surface at the corner part, and thus the influence on the light distributing performance is minimized.

11 Claims, 4 Drawing Sheets

FIG. 4
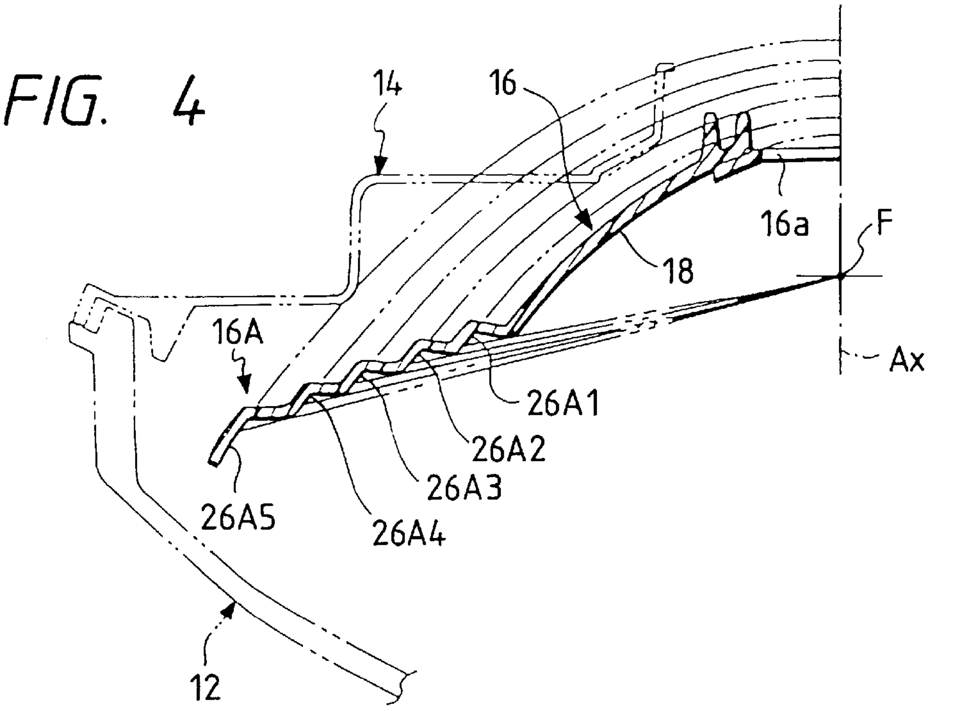
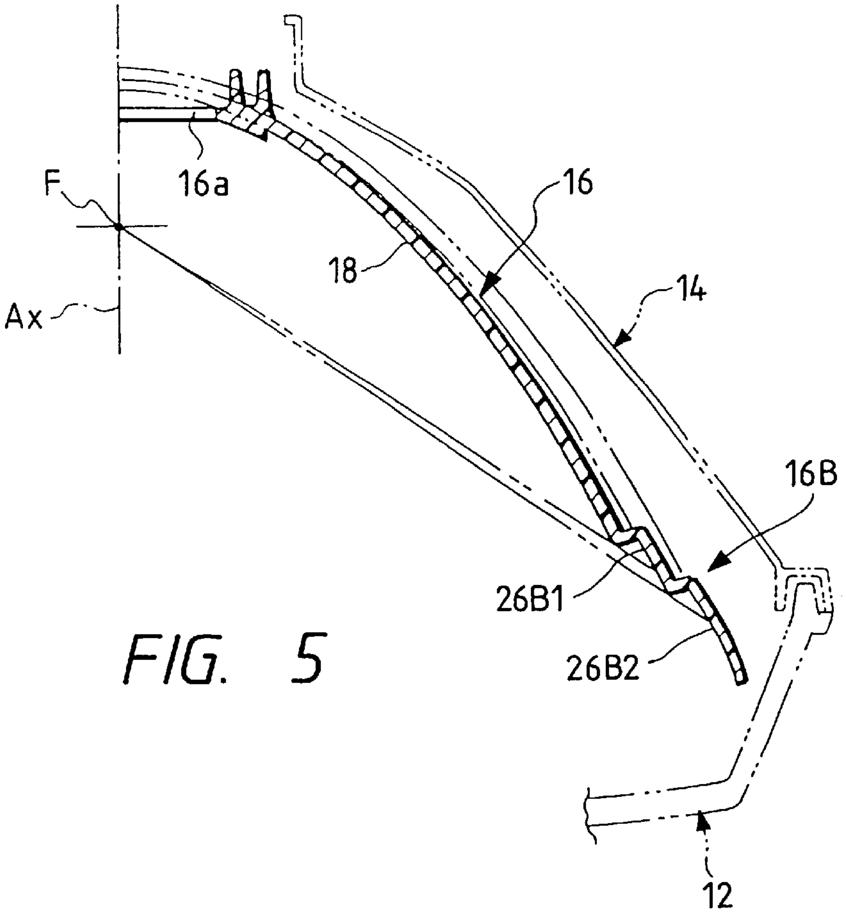
FIG. 5

VEHICULAR LAMP HAVING IMPROVED OUTER APPEARANCE

BACKGROUND OF THE INVENTION

The present invention relates to a vehicular lamp such as may be used on an automobile. Particularly, the invention relates to a reflector used in such a lamp.

Approximately rectangular external configurations have been largely adopted for vehicular lamps in recent years for reasons such as design requirements, and, as a result, the external configuration of reflectors used in such lamps also has come to be approximately rectangular.

The reflector generally has a reflective surface consisting of a round surface such as a paraboloid; however, in a case where a reflector of an approximately rectangular external configuration in a case where a sufficient depth cannot be provided for a reflector due to design restrictions on layout of the lamp, formation of reflective surfaces at corner parts is physically difficult, and thus the constitution of such corner parts with non-reflective surfaces around the periphery of the reflective surface cannot be avoided. As a result, the above-described corner parts become dark parts without reflected light, even when the bulb is illuminated. This creates a generally unfavorable appearance in the front view of the lamp.

In this case, although it is possible to eliminate non-reflective surfaces at the above-described corner parts by forming the entire area of the reflector with multiple reflection surfaces, this raises another problem that the light distributing performance of the lamp is degraded by the employment of the multiple reflection surfaces, which results in a small available solid angle of the reflector compared with a single reflection surface.

Although it is also possible to eliminate non-reflective surfaces at the above-described corner parts by forming the entire area of the reflector as a single reflection surface composed of a paraboloid with a long focal distance, this raises a problem similar to the one described above since the available solid angle of the reflector becomes smaller as the focal distance becomes the longer.

SUMMARY OF THE INVENTION

In consideration of the circumstances described above, it is an object of the present invention to provide a lamp comprising a reflector which has corner parts composed of non-reflective surfaces, where the front-view appearance of the lamp when the bulb is illuminated can be improved while the influence on the light distributing performance is minimized.

It is not the intention of the present invention to eliminate every non-reflective surface in the above-described corner parts through formation of such multiple reflection surfaces over the entire area of the reflector, but it is intended to achieve the above-described object through partial formation of multiple reflection surfaces at segmental parts in the reflector to the extent necessary to illuminate the corner parts of the reflector so as to improve the appearance of the lamp.

More specifically, the present invention provides a vehicular lamp having a reflector having a corner part composed of an otherwise non-reflective surface formed at the periphery of such corner part, wherein at least one part of the non-reflective surface and a proximate part of the corner part of the reflective surface is segmented in a diagonal direction in a prescribed width, and wherein a plurality of small reflective surfaces are formed in a step-like manner in the diagonal direction at this segmental part.

Although it is needless to say that the aforementioned reflective surface may be formed as a single curved surface having the shape of c paraboloid or the like, it also may be a multiple reflection surface composed of a plurality of curved surfaces. The multiple reflection surface in this case is a multiple surface which is formed on the premise that the non-reflective surface is to the outside of such multiple reflection surface at the corner part of the reflector, and which has a concept completely different from that of the multiple reflection surface formed so as to eliminate every non-reflective surface at the corner parts of the reflector as described above.

The term "diagonal direction" means the direction of a straight line connecting the optical axis of the reflector and the most exterior point of the corner part.

The "prescribed width" means the width necessary and sufficient to illuminate the corner parts of the reflector so as to improve the appearance of the lamp by means of the plurality of the multiple reflection surfaces, and concrete dimensions should be established with consideration to balancing improvement in the appearance of the lamp and control of degradation in the light distributing performance of the lamp.

Although the "at least one part of the aforementioned non-reflective surface" may or may not include the most exterior point of the corner part, inclusion of such most exterior point is favorable for further improvement in the appearance of the lamp.

Moreover, although the "at least one part of the aforementioned non-reflective surface" means a part of or the entire part of the non-reflective surface, the selection between one part and the entire part is to be made according to the relation between the established value for the aforementioned prescribed width and the size of the non-reflective surface.

As described above, at least one part of the non-reflective surface and the proximate part of the corner part of the reflective surface is segmented in the diagonal direction in the prescribed width, while a plurality of small reflective surfaces are formed in a step-like manner in the diagonal direction at this segmental part, and thus the following actions and effects can be obtained.

Since reflected light is provided from each of the aforementioned small reflective surfaces when the bulb is illuminated, the reflector can illuminate the most exterior point of the corner part or the vicinity of the most exterior point, in comparison with the case where the segmental part is not provided, and thus the front-view appearance of the lamp is improved.

Since the small reflective surfaces are formed in an area where at least one part of the non-reflective surface and the proximate part of the corner part of the reflective surface is segmented in the diagonal direction in the prescribed width, in other words, in an area necessary and sufficient to illuminate the corner parts of the reflector so as to contribute to an improvement in the appearance of the lamp, a larger available solid angle can be ensured in the reflective area located on both sides of the aforementioned segmental part than in the case where the entire area of the reflector is formed with multiple reflection surfaces or with, for example, a single reflective surface having a long focal distance so as to eliminate every non-reflective surface at the corner part, and thus the influence on the light distribution performance of the reflector can be minimized.

Therefore, according to the present invention, a vehicular lamp which comprises a reflector having a corner part composed of a non-reflective surface has an improved front-view appearance when the bulb is illuminated, while the influence on the light distribution performance is minimized.

Moreover, since the small reflective surfaces formed at the aforementioned segmental part are formed in deep positions of the reflector in comparison with other parts of the corner parts, the impression of depth of the reflector is enhanced, which improves the appearance of the lamp even when the bulb is not illuminated.

In the above-described construction, if the paraboloid constitutes the aforementioned reflective surface and a plurality of paraboloids, which are coaxial with the aforementioned reflective surface and are identically focusing with different focal lengths, constitute the plurality of small reflective surfaces, the reflected light from the aforementioned reflective surface and the aforementioned small reflective surfaces are emitted toward the front of the reflector as parallel light beams, light distribution control by the lens provided at the front of the reflector is facilitated, and reflected light from the aforementioned reflective surface and the aforementioned small reflective surfaces are visually recognized simultaneously in a front view of the lamp, which further improves the appearance of the lamp.

In the above-described construction, if the segmental part is formed in a sectorial configuration extending outward in the diagonal direction, the formation of the lateral walls of such segmental part having angular and positional relations which prevent entrance of the light from the bulb is facilitated, and thus the generation of stray light on both of the lateral walls can be effectively prevented.

BRIEF DESCRIPTION OF THE DRAWINGS

FIG. 4 is a sectional view taken along a line IV—IV in FIG. 1; and

FIG. 5 is a sectional view taken along a line V—V in FIG. 1.

DESCRIPTION OF THE PREFERRED EMBODIMENTS

With references to the drawings, preferred embodiments of the present invention will be described below.

Figure 1:
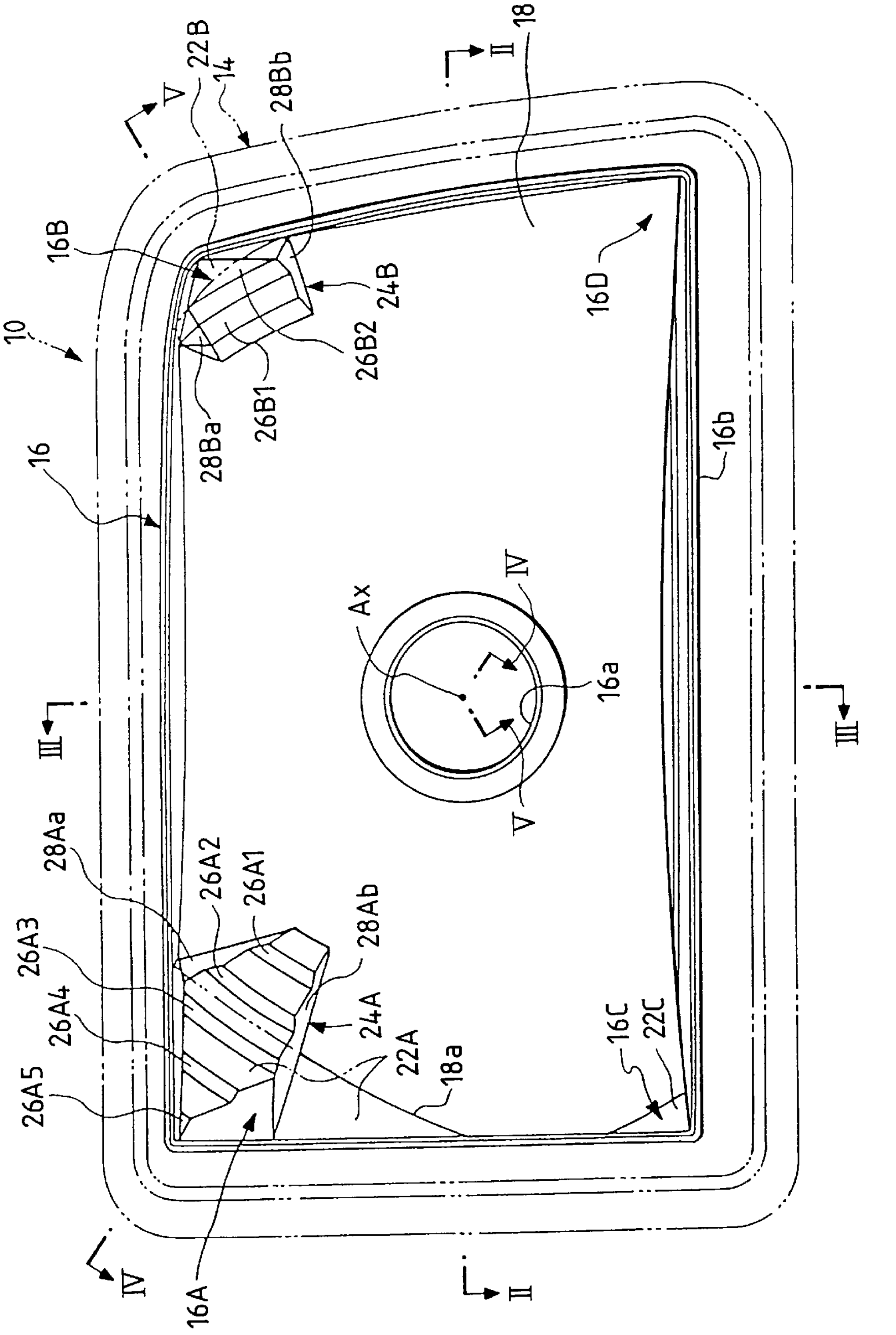
FIG. 1 is a front view of a reflector which is an important part of an embodiment of a vehicular lamp according to the present invention.
Figure 2:
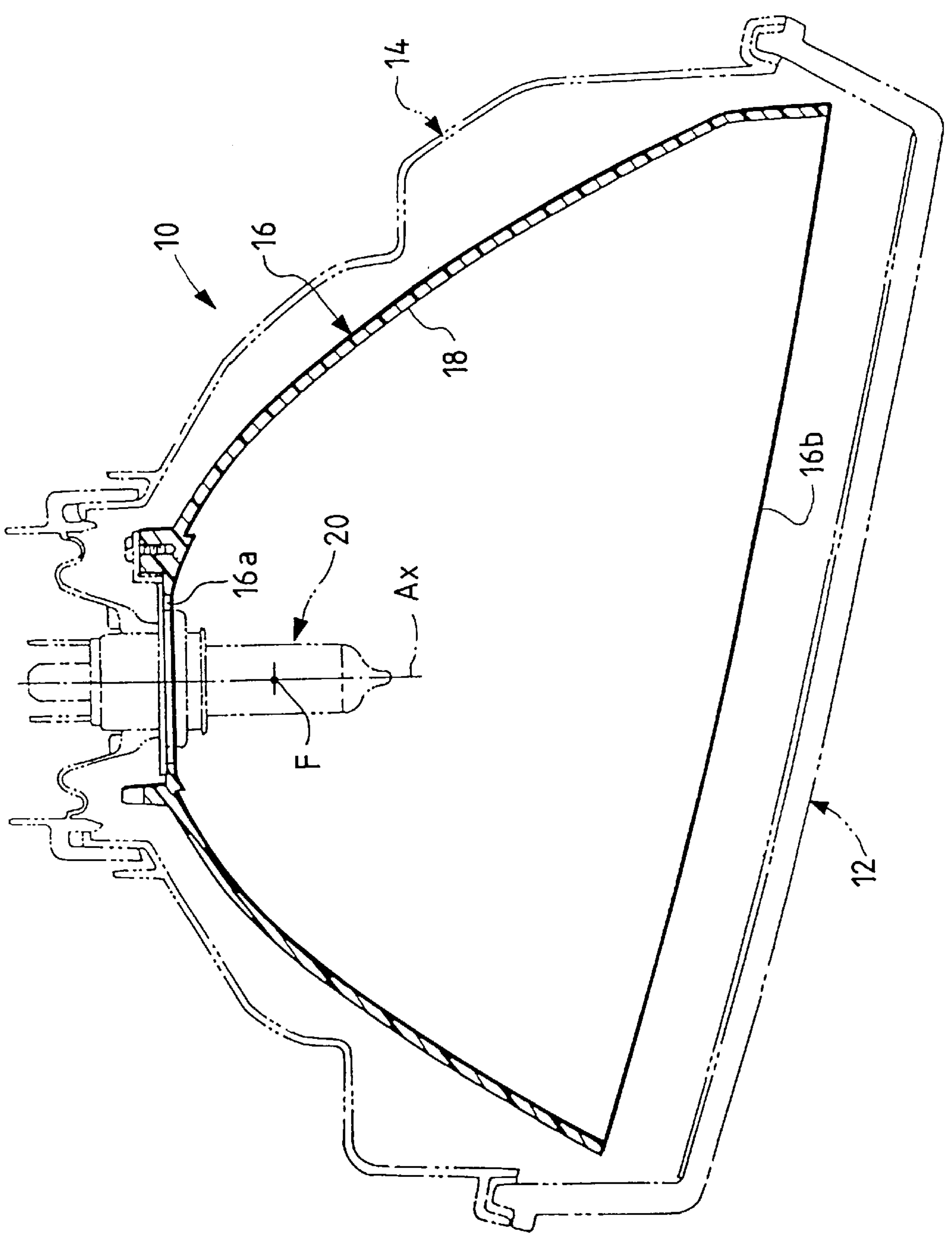
FIG. 2 is a sectional view taken along a line II—II in FIG. 1 showing the aforementioned reflector together with other constituent parts.
Figure 3:
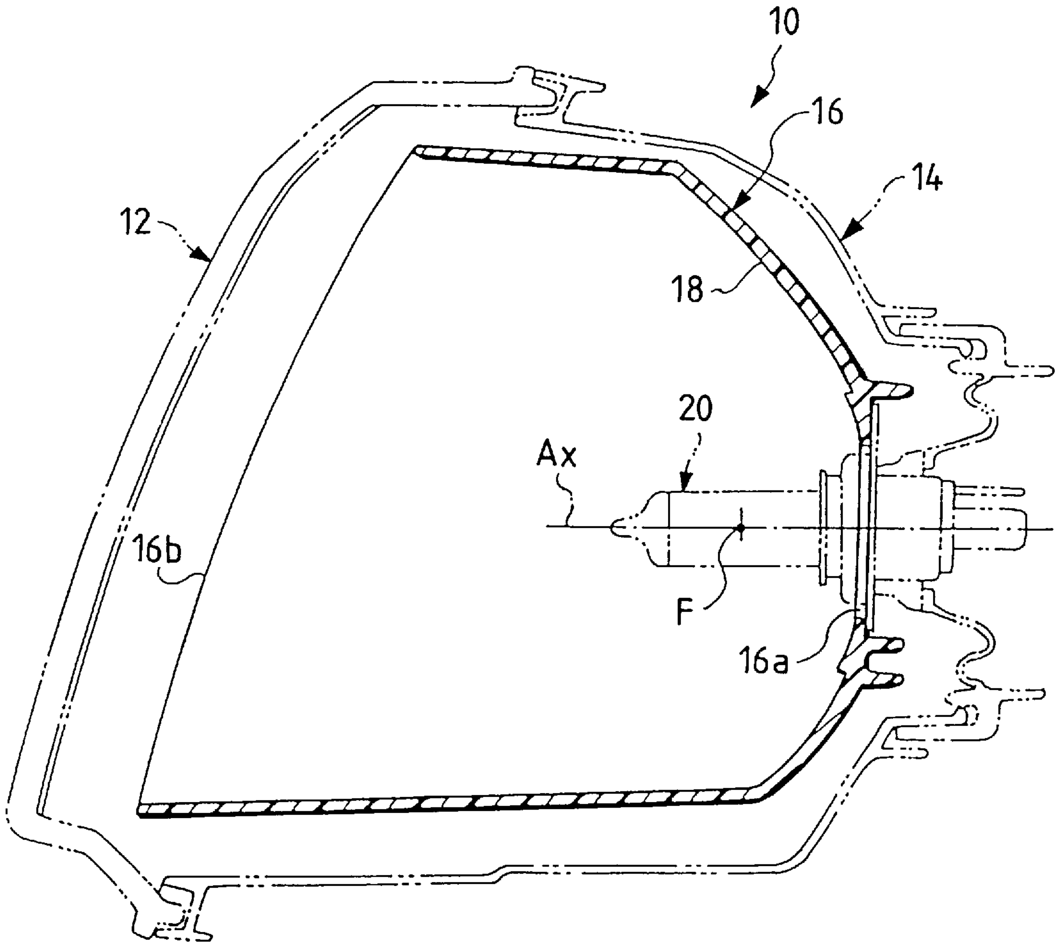
FIG. 3 is a sectional drawing taken along a line III—III in FIG. 1 showing the aforementioned reflector together with other parts.

FIG. 1 is a front view of a reflector of a preferred embodiment of a vehicular lamp constructed according to the present invention, and FIGS. 2 and 3 are sectional drawings taken along a line II—II and a line III—III, respectively, in FIG. 1 showing the aforementioned reflector together with other constituent parts, while FIGS. 4 and 5 are sectional drawings taken along a line IV—IV and a line V—V in FIG. 1.

As FIGS. 2 and 3 show, the vehicular lamp 10 is a headlamp adapted to be attached to the right side of the front of a vehicle. A reflector 16 is housed within the lamp 10, mounted so as to be tiltable in the vertical direction and in the widthwise direction within a chamber defined between a lens 12 and a lamp body 14. The reflective surface 18 of the aforementioned reflector 16 is constituted by a paraboloid. A bulb 20 (H4 bulb) is inserted into and secured to a bulb insertion hole 16*a* formed at the rear top of the reflector 16 so that the filament of the bulb is located in the vicinity of the focus F on the optical axis Ax of the reflective surface 18.

As FIG. 1 shows, the aforementioned lamp 10 has an external configuration approximate to a rectangle in front view, and the aforementioned reflector 16 also has an external configuration approximate to a rectangle. As FIGS. 2 and 3 show, the surface of the lens 12 of the lamp 10 is inclined both in the vertical direction and in the horizontal direction in such a manner that top end side and the exterior end side in the widthwise direction of the vehicle are displaced to the rear. Accompanying this, the outer front end opening rim 16*b* of the aforementioned reflector 16 is also inclined in the vertical direction and the horizontal direction.

Due to such external configuration of the reflector 16 and the front end opening rim 16*b*, a part of the outer rim 18*a* of the reflective paraboloid surface 18 is located inside the outer front end opening rim 16*b* of the reflector 16. In this case, if the only reflective surface were the surface 18, as auxiliarily shown with a two-dot broken line in FIG. 2, a relatively large non-reflective surface 22A at the periphery of the reflective surface 18 would constitute an upper end corner part 16A on the outer square side in the widthwise direction of the vehicle, while relatively small non-reflective surfaces 22B and 22C would be formed constituting an upper end corner part 16B on the inner side in the widthwise direction of the vehicle and a lower end corner part 16C on the outer square side in the widthwise direction of the vehicle. The only corner part filled by the reflective surface 18 would be only a lower end corner part 16D on the inner side in the widthwise direction of the vehicle.

If they were left non-reflective, the three corner parts 16A, 16B and 16C would constitute dark areas where there would be no reflected light, even if the bulb 20 is illuminated, which would degrade the front-view appearance of the lamp. Therefore, to avoid this problem, multiple reflection surfaces are formed partially at the upper end corner parts 16A and 16B on the outer side in the widthwise direction of the vehicle and on the inner side in the widthwise direction of the vehicle.

That is, at the upper end corner part 16A on the outer side in the widthwise direction of the vehicle, the proximate part of such corner part of the reflective surface 18 and a part (approximately the upper half) of the non-reflective surface 22A are segmented in the diagonal direction in the prescribed width, while five small reflective surfaces 26A1, 26A2, 26A3, 26A4 and 26A5 are formed in a step-like manner in the diagonal direction at the segmental part 24A. Also, at the upper end corner part 16B on the inner side in the widthwise direction of the vehicle, the proximate part of such corner part of the reflective surface 18 and the entire area of the non-reflective surface 22B are segmented in the diagonal direction in the prescribed width, while two small reflective surfaces 26B1 and 26B2 are formed in a step-like manner in the diagonal direction at the segmental part 24B.

The aforementioned segmental parts 24A and 24B are formed in sectorial shapes extending toward the outer side in the diagonal direction. Of these two, since the segmental part 24A has a wide sectorial angle, light from the bulb 20 does not reach either of the lateral walls 28A*a* and 28A*b*, and thus generation of stray light on both the lateral walls 28A*a* and 28A*b* can be prevented effectively. On the other hand, since the segmental part 24B has a narrow sectorial angle, light from the bulb 20 reaches the upper lateral wall 28B*a* of the two lateral walls 28B*a* and 28B*b*. For this reason, the upper lateral wall 28B*a* is formed in a step-like manner to reflect light in a direction where there is no problem of light distribution.

As FIG. 4 shows, a plurality of paraboloids, which have the same axes as the optical axis Ax of the reflective surface 18 as well as the same foci but different focal distances, constitute the five small reflective surfaces 26A1, 26A2, 26A3, 26A4 and 26A5 formed at the segmental part 24A at the upper end corner part 16A on the outer side in the widthwise direction of the vehicle. The small reflective surface 26A5 on the outermost rim extends to the most exterior point of the corner part 16A. As FIG. 5 shows, a plurality of paraboloids, which have the same axes as the optical axis Ax of the aforementioned reflective surface 18 as well as the same foci but different focal distances, constitute the two small reflective surfaces 26B1 and 26B2 which are formed at the segmental part 24B at the upper end corner part 16B on the inner side in the widthwise direction of the vehicle. The small reflective surface 26B2 on the outer rim extends to the most exterior point of the corner part 16B.

As FIG. 1 shows, a part (approximately the lower half) of the non-reflective surface 22A of the upper end corner part 16A on the outer square side in the widthwise direction of the vehicle, which is not segmented, retains its original non-reflective surface, and such part will not be illuminated even when the bulb is illuminated, but since the five small reflective surfaces 26A1 through 26A5, which are located at the most exterior point of the corner part 16A in the diagonal direction, are illuminated when the bulb is illuminated, retaining part of the aforementioned non-reflective surface 22A does not cause a problem in the appearance of the lamp 10.

As for the lower end corner part 16C on the outer side in the widthwise direction of the vehicle, the non-reflective surface 22C remains as it is without formation of the small reflective surface as described above because the non-reflective surface 22C is only a small area and the lower part of the reflector does not affect the appearance of the lamp 10 so much as the upper part of the reflector and because the reflective area in the vicinity of the lower end corner part 16C is important for the light distributing function since it is in the vicinity of the cut line formed by the bulb 20 when the low beam is utilized, and thus adoption of a complicated reflective configuration is not favorable.

As described above, this embodiment of the invention includes the reflector 16 having three corner parts 16A, 16B and 16C, which are formed as non-reflective surfaces, and the two upper end corner parts 16A and 16B, which are concerned with appearance of the lamp 10, where the proximate part of the corner part of the reflective surface 18 and a part of the non-reflective surface 22A or the entire area of the non-reflective surface 22B are segmented in the diagonal direction in a prescribed width and where the five small reflective surfaces 26A1 through 26A5 at the segmental part 24A of the upper end corner part 16A on the outer square side in the widthwise direction of the vehicle and the two small reflective surfaces 26B1 and 26B2 at the segmental part 24B of the upper end corner part 16B on the inner side in the widthwise direction of the vehicle are formed in a step-like manner in the diagonal direction. A lamp employing such a reflector can provide the following actions and effects.

With the reflected light provided from the aforementioned small reflective surfaces 26A1 through 26A5 as well as 26B1 and 26B2 when the bulb is illuminated, the reflector 16 can be illuminated to the most exterior points at the upper end corner parts 16A and 16B, and thus the front-view appearance of the lamp 10 is improved.

Moreover, since the aforementioned small reflective surfaces 26A1 through 26A5 as well as 26B1 and 26B2 are formed in areas where the proximate part of the upper end corner parts 16A and 16B of the reflective surface 18 and a part of the non-reflective surface 22A or the entire area of the non-reflective surface 22B are segmented in the diagonal direction in the prescribed width, or in other words, since the areas necessary and sufficient to illuminate both the upper end corner parts 16A and 16B of the reflector 16 so as to contribute to the improvement in appearance of the lamp 10 are made reflective, the available solid angles on both sides of the segmental parts 24A and 24B are wider than in the case where all areas of the reflector 16 are formed as a single multiple reflection surface or a single reflection surface consisting of a paraboloid with a long focal distance is employed so as to eliminate every non-reflective surface at the upper end corner parts 16A and 16B, and thus the influence on the light distributing performance is minimized.

Therefore, this embodiment of the invention provides a lamp having a reflector which has corner parts which are non-reflective surfaces, wherein the front-view appearance of the lamp when the bulb is illuminated is improved while the influence on the light distributing performance is minimized.

Furthermore, since the small reflective surfaces 26A1 through 26A5 as well as 26B1 and 26B2 formed in the aforementioned segmental parts 24A and 24B are formed at deeper positions than the other positions at the upper end corner parts 16A and 16B, the appearance of the lamp 10 when the bulb is not illuminated can be improved as well.

Additionally, since the reflective surface 18 of the lamp is composed of paraboloids and the small reflective surfaces 26A1 through 26A5 as well as 26B1 and 26B2 are formed as a plurality of paraboloids which have the same axes as the reflective surface 18 as well as the same foci but different focal distances, the Light reflected on the reflective surface 18 and the small reflective surfaces 26A1 through 26A5 as well as 26B1 and 26B2 is radiated parallel toward the front of the reflector 16. As a result, light distribution control by the lens 12 positioned to the front of the reflector 16 is facilitated and the reflected light from the reflective surface 18 and the small reflective surfaces 26A1 through 26A5 as well as 26B1 and 26B2 can be seen at the front view of the lamp, which further improves the appearance of the lamp 10.

What is claimed is:

1. A vehicular lamp comprising:

a light source;

a reflector for reflecting light produced by said light source, said reflector having a curved reflective main part for reflecting light in a forward direction of said reflector and at least one non-reflective corner part at a periphery of said main part; and a lens covering a front opening of said reflector, wherein at least part of said corner part adjacent said reflective surface is segmented in a diagonal direction of said reflector and with a predetermined width, and a plurality of small reflective surfaces are formed in a step-like manner in said diagonal direction at the segmented part of said corner part.

2. The vehicular lamp as claimed in claim 1, wherein said main part of said reflector has a paraboloid shape, and said small reflective surfaces each have paraboloid shapes and are coaxial with said main reflective surface and have focal points substantially coincident with a focal point of said main part of said reflector, but have focal lengths which are different from a focal length of said main part.

3. The vehicular lamp as claimed in claim 1, wherein said segmented part of said corner part has a sectorial shape extending outward in said diagonal direction.

4. The vehicular lamp as claimed in claim 1, wherein said reflector has a substantially rectangular shape at said front opening.

5. The vehicular lamp as claimed in claim 1, wherein said lens has a lens surface that is inclined in first and second directions that are perpendicular to each other, such that a top end and an exterior side end in a widthwise direction of a vehicle on which said lamp is mounted are displaced rearwardly toward said lamp.

6. A vehicular lamp comprising:

a light source;

a reflector for reflecting light produced by said light source, said reflector having a curved reflective main part for reflecting light in a forward direction of said reflector and first and second non-reflective corner parts at opposite ends of an upper side of a periphery of said main part; and a lens covering a front opening of said reflector, wherein at least part of said first and second corner parts adjacent said reflective surface is segmented in a diagonal direction of said reflector and with a predetermined width, and a plurality of small reflective surfaces are formed in a step-like manner in said diagonal direction at the segmented part of said corner parts.

7. The vehicular lamp as claimed in claim 6, wherein said main part of said reflector has a paraboloid shape, and said small reflective surfaces each have paraboloid shapes and are coaxial with said main reflective surface and have focal points substantially coincident with a focal point of said main part of said reflector, but have focal lengths which are different from a focal length of said main part.

8. The vehicular lamp as claimed in claim 6, wherein said segmented part of said corner parts has a sectorial shape extending outward in said diagonal direction.

9. The vehicular lamp as claimed in claim 6, wherein said reflector has a substantially rectangular shape at said front opening.

10. The vehicular lamp as claimed in claim 6, wherein said lens has a lens surface that is inclined in first and second directions that are perpendicular to each other, such that a top end and an exterior side end in a widthwise direction of a vehicle on which said lamp is mounted are displaced rearwardly toward said lamp.

11. The vehicular lamp as claimed in claim 6, wherein said reflector comprises at least a third non-reflective corner part at a lower side thereof.

* * * * *